US010022984B2

(12) United States Patent
Irie

(10) Patent No.: US 10,022,984 B2
(45) Date of Patent: Jul. 17, 2018

(54) DRAWING APPARATUS AND DRAWING METHOD FOR DRAWING APPARATUS

(71) Applicant: CASIO COMPUTER CO., LTD., Shibuya-ku, Tokyo (JP)

(72) Inventor: Tamotsu Irie, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/434,495

(22) Filed: Feb. 16, 2017

(65) Prior Publication Data

US 2017/0266983 A1 Sep. 21, 2017

(30) Foreign Application Priority Data

Mar. 18, 2016 (JP) ................................ 2016-054637

(51) Int. Cl.

| | |
|---|---|
| *G06K 15/22* | (2006.01) |
| *B41J 3/407* | (2006.01) |
| *A45D 29/00* | (2006.01) |
| *A45D 34/04* | (2006.01) |
| *B41J 2/01* | (2006.01) |

(52) U.S. Cl.

CPC ............ *B41J 3/4073* (2013.01); *A45D 29/00* (2013.01); *A45D 34/04* (2013.01); *B41J 2/01* (2013.01)

(58) Field of Classification Search

None

See application file for complete search history.

(56) References Cited

U.S. PATENT DOCUMENTS

| | | | | |
|---|---|---|---|---|
| 5,261,038 A * | 11/1993 | Adroher | G01D 15/16 | 358/1.3 |
| 6,286,517 B1 * | 9/2001 | Weber | A45D 29/00 | 132/200 |
| 6,517,184 B1 * | 2/2003 | Bruch | B41J 2/16579 | 347/19 |
| 2002/0027575 A1 * | 3/2002 | Bruch | B41J 2/0451 | 347/19 |
| 2003/0117455 A1 * | 6/2003 | Bruch | B41J 2/16579 | 347/23 |
| 2007/0109310 A1 * | 5/2007 | Xu | G06T 15/02 | 345/581 |
| 2011/0018880 A1 * | 1/2011 | Whited | G06T 11/203 | 345/473 |

(Continued)

FOREIGN PATENT DOCUMENTS

JP 2003534083 A 11/2003

*Primary Examiner* — Ted Barnes

(74) *Attorney, Agent, or Firm* — Holtz, Holtz & Volek PC

(57) ABSTRACT

A drawing apparatus including a drawing unit that detachably holds a drawing tool that performs a drawing on an object and a drawing tool standby unit for causing at least one spare drawing tool to stand by.

In a state where a first drawing tool is caused to be held in the drawing unit and a second drawing tool is caused to be held in the drawing tool standby unit, the drawing unit is controlled to perform a drawing within a first region of the object by using the first drawing tool and, when a first undrawn area occurred within the first region, the first undrawn area being an area where the first drawing tool was not performed correctly, the first drawing tool held is caused to be replaced with the second drawing tool; and the drawing unit is caused to perform a drawing in the undrawn area by using the second drawing tool.

15 Claims, 7 Drawing Sheets

(56) References Cited

U.S. PATENT DOCUMENTS

| | | | | |
|---|---|---|---|---|
| 2011/0225331 | A1* | 9/2011 | Dodge | G06F 3/038 710/100 |
| 2011/0261060 | A1* | 10/2011 | Waibel | G06T 13/80 345/473 |
| 2016/0297209 | A1* | 10/2016 | Palumbo | B41J 3/407 |
| 2017/0065053 | A1* | 3/2017 | Nagao | G06T 7/001 |

* cited by examiner

DRAWING APPARATUS AND DRAWING METHOD FOR DRAWING APPARATUS

CROSS-REFERENCE TO RELATED APPLICATIONS

The present invention contains subject matter related to Japanese Patent Application No. 2016-054637 filed in the Japanese Patent Office on Mar. 18, 2016, the entire contents of which are incorporated herein by reference.

BACKGROUND OF THE INVENTION

1. Field of the Invention

The present invention relates to a drawing apparatus and a drawing method for a drawing apparatus.

2. Description of the Related Art

Conventionally, drawing apparatuses for drawing nail designs on nails are known. For example, Japanese Unexamined Patent Application Publication (Translation of PCT Application) No. 2003-534083 describes a drawing apparatus for performing drawing of a nail design on a nail by using ink jet printing.

Additionally, the use of a plotter drawing apparatus on which a writing utensil (a pen) that applies a drawing is mounted has also been investigated as a drawing apparatus (a nail printing apparatus) for drawing a nail design such as a color, design, or the like on the surface of a nail.

Compared to an ink jet type drawing apparatus in which small droplets of ink are discharged, there are fewer restrictions related to the viscosity of usable inks, the particle size of the coloring material included in the ink, and the like in cases where drawing is performed by using a pen. With the latter, inks with excellent color development that include coloring material that has a large particle size, and high-viscosity inks such as light-curable inks can be used. With such drawing apparatuses, it is possible to draw various types of nail designs, the same as would be performed at a nail salon.

However, in the case of a drawing apparatus in which a pen is used, there are cases where ink cannot be satisfactorily applied to the surface of the nail depending on the condition of the pen tip, the condition of the surface of the object, namely the nail, and the like. In such a case, partially unpainted areas (undrawn areas) may occur on the surface of the nail.

In cases where drawing on a nail by ink jet printing, in order to apply high-definition drawing, a base layer must be applied to the surface of the nail before performing the drawing by ink jet printing. Moreover, there are drawing apparatuses provided with ink jet printing and plotter printing technology that are configured to apply base layer ink to the surface of the nail by using a pen.

Here, when applying the base layer ink to the nail by using a pen, there are cases where an unpainted area of the base layer ink occurs in part on the nail. In such cases, if the nail design is drawn by ink jet printing on the portions where the base layer has been applied and where the base layer has not been applied, there will be variations in the spreading, coloration, and the like of the ink. Consequently, if the drawing of the nail design is performed by ink jet printing in this condition, the finish quality of the nail design will decline.

BRIEF SUMMARY OF THE INVENTION

The present invention is advantageous in that a drawing apparatus and a drawing method for the drawing apparatus are provided whereby the occurrence of unpainted undrawn areas in the region of the object can be prevented and drawing with a beautiful finish can be performed.

In order to obtain the advantages described above, the drawing apparatus of the present invention includes a drawing unit that detachably holds a first drawing tool that performs a drawing on an object; a drawing tool standby unit that causes a second drawing tool to stand by, the second drawing tool being capable of performing the drawing; and a processor.

In such a drawing apparatus, in a state where the first drawing tool is held in the drawing unit and the second drawing tool is held in the drawing tool standby unit, the processor controls the drawing unit to perform a drawing within a first region of the object by using the first drawing tool, causes the first drawing tool to be replaced with the second drawing tool in a case where a first undrawn area occurred within the first region, the first undrawn area being an area where the first drawing tool was not performed correctly, and controls the drawing unit to perform a drawing within the first undrawn area by using the second drawing tool.

In order to obtain the advantages described above, in the drawing method for a drawing apparatus of the present invention, the drawing apparatus includes a drawing unit that detachably holds a first drawing tool that performs a drawing on an object; and a drawing tool standby unit that causes a second drawing tool to stand by, the second drawing tool being capable of performing the drawing.

The drawing method includes a first drawing control step in which, in a state where the first drawing tool is held in the drawing unit and the second drawing tool is held in the drawing tool standby unit, the drawing unit is controlled to cause a drawing to be performed within a first region of the object by using the first drawing tool; a first replacing step in which the first drawing tool is caused to be replaced with the second drawing tool, in a case where a first undrawn area occurred in the first region, the first undrawn area being an area where the first drawing tool was not performed correctly; and a second drawing control step in which the drawing unit is controlled to perform a drawing in the first undrawn area by using the second drawing tool.

DETAILED DESCRIPTION OF THE INVENTION

Figure 1B:
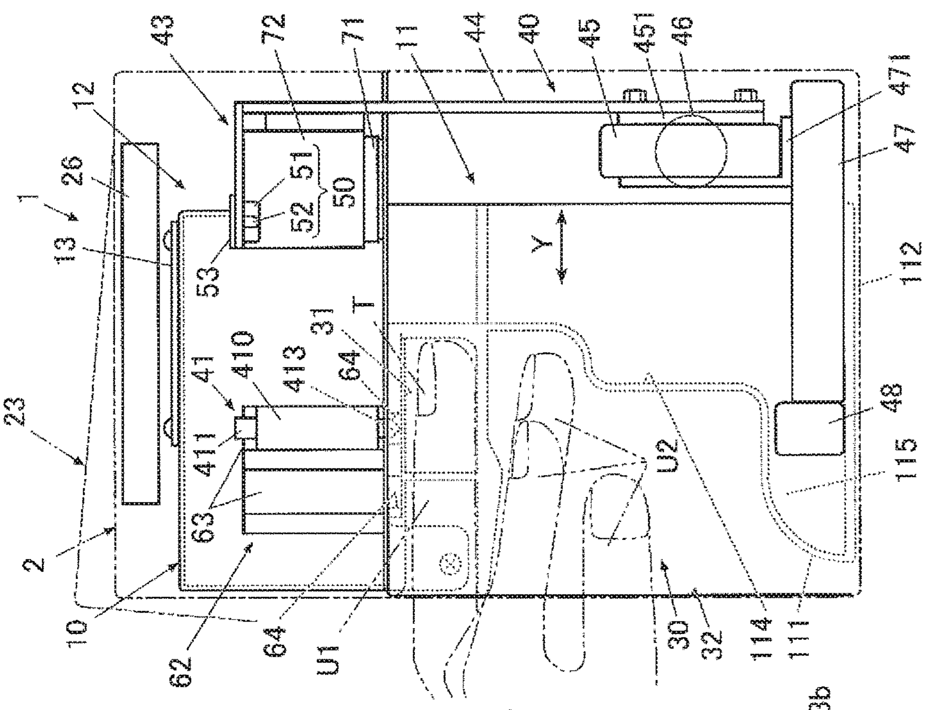
FIG. 1B is a side view illustrating an internal configuration of the drawing apparatus illustrated in FIG. 1A.

Embodiments of the nail printing apparatus (a drawing apparatus) and drawing method for the nail printing apparatus (the drawing apparatus) according to the present invention are described below in detail while referring to the drawings.

First Embodiment

A first embodiment of the nail printing apparatus (the drawing apparatus) and the drawing method for the nail printing apparatus (the drawing apparatus) according to the present invention is described below, while referring to FIGS. 1A and 1B.

While various limitations, which are technically preferable from the perspective of carrying out the present invention, are placed on the embodiments described below, the scope of the present invention should not be construed to be limited to the embodiments or the examples illustrated in the drawings.

In the following embodiment, a nail printing apparatus 1 will be described as an apparatus for drawing on an object, namely a fingernail. However, the object of the present invention is not limited to a fingernail and, for example, may be a toenail.

Figure 1A:
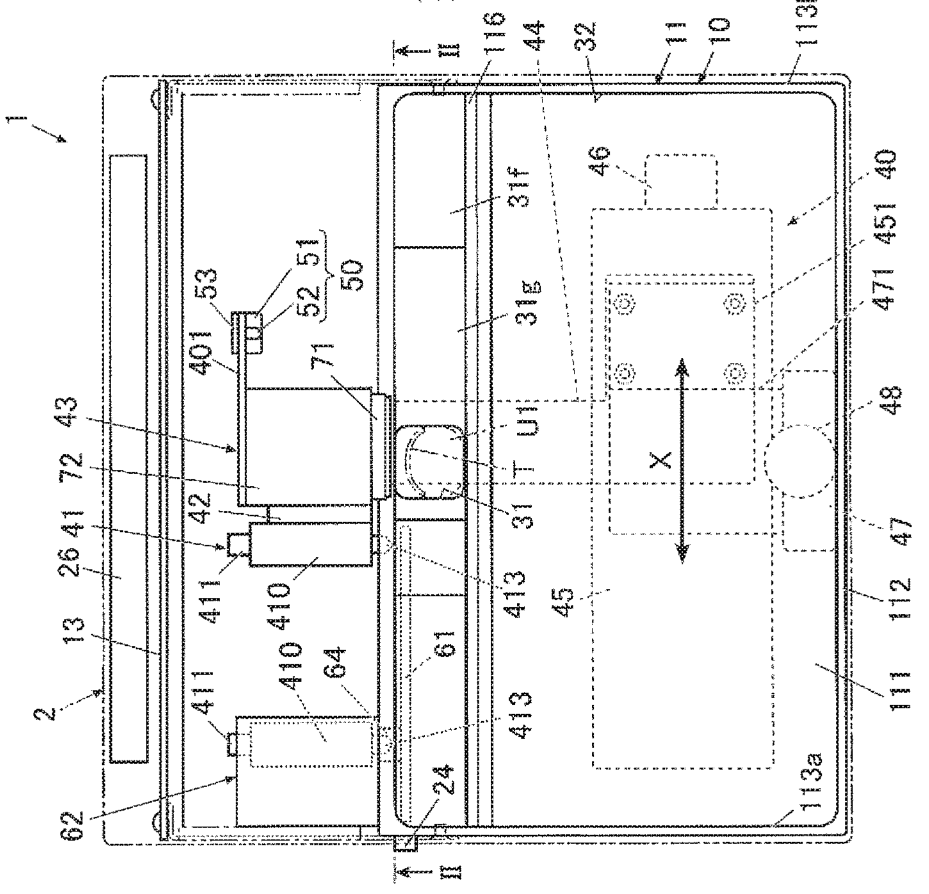
FIG. 1A is a front view of a drawing apparatus according to a first embodiment of the present invention.

FIG. 1A is a front view illustrating an internal configuration of the nail printing apparatus.

FIG. 1B is a side view illustrating an internal configuration of the drawing apparatus illustrated in FIG. 1A.

Figure 2:
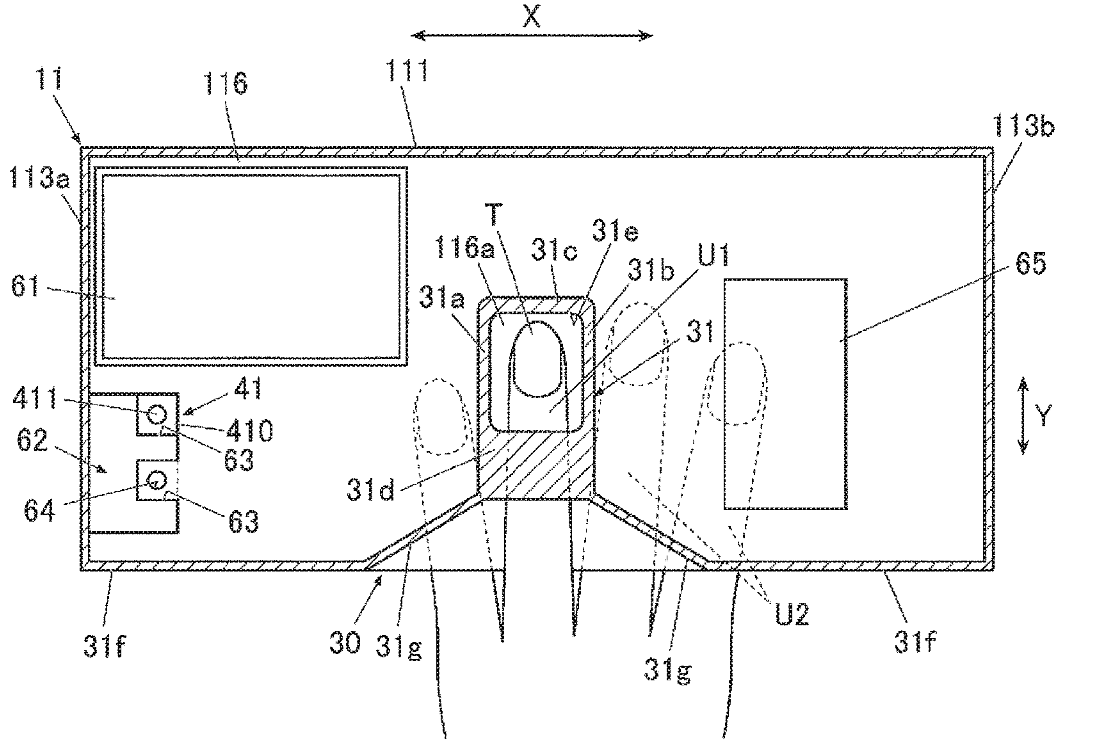
FIG. 2 is a cross-sectional view taken along line II-II in FIG. 1A.

FIG. 2 is a cross-sectional view taken along line II-II in FIG. 1A.

As illustrated in FIGS. 1A and 1B, in the nail printing apparatus 1 of the present embodiment, a drawing head 43 is provided with a pen 41 and an ink jet head 71. The nail printing apparatus 1 of the present embodiment is a drawing apparatus that uses plotter printing and ink jet printing to apply a drawing on a nail T.

The nail printing apparatus 1 is provided with a case body 2 and an apparatus main body 10 housed in the case body 2.

As illustrated in FIG. 1B, a cover 23, configured to be openable and closeable, for replacing the pen 41 and the ink jet head 71 of the hereinafter described drawing unit 40 is provided on the case body 2 from an upper surface thereof to an upper portion front surface.

The cover 23 is rotatable via, for example, a hinge or the like, from a closed state to an open state, as illustrated in FIG. 1B.

An operation unit 25 (see FIG. 3) is set on the upper surface (top panel) of the case body 2.

The operation unit 25 is an input unit where a user performs various types of input.

Operation buttons (not illustrated) for performing various types of input are set in the operation unit 25. Examples of the operation buttons include a power switch button for turning on the power of the nail printing apparatus 1, a stop switch button for stopping operation, a design selection button for selecting a design image to be drawn on the nail T, a drawing start button for commanding the drawing to start, and the like.

A display unit 26 is set approximately in a center portion of the top surface (top panel) of the case body 2.

The display unit 26 is configured from, for example, a liquid crystal display (LCD), an organic electroluminescence display, or other type of flat display.

In the present embodiment, examples of images appropriately displayed on the display unit 26 include nail images obtained by imaging the print finger U1 (finger images including images of the nail T), images of the outline or the like of the nail T included in the nail images, design selection images for selecting a design image to be drawn on the nail T, thumbnail images for design confirmation, command screens displaying various commands, and the like.

As described hereinafter, in the present embodiment, a configuration is provided in which the display unit 26 is caused to display a notification in cases where the drawing by the pen 41 is not possible so as to inform and alert a user. Thus, the display unit 26 functions as notification means.

Note that a configuration is possible in which a touch panel for performing various types of input is integrated into the surface of the display unit 26.

The apparatus main body 10 is formed into a rough box-shape and is provided with a lower frame 11 set in the lower portion of the interior of the case body 2, and an upper frame 12 set above the lower frame 11 and in the upper portion of the interior of the case body 2.

First, the lower frame 11 will be described.

The lower frame 11 has a back surface plate 111, a bottom plate 112, a pair of left and right side plates 113*a* and 113*b*, an X-direction movement stage housing 114, a Y-direction movement stage housing 115, and a dividing wall 116.

Bottom edges of the side plates 113*a* and 113*b* are joined respectively to left and right edges of the bottom plate 112. The side plates 113*a* and 113*b* are provided in an upright state on the bottom plate 112.

A lower portion of the back surface plate 111 is formed so as to sink forward (toward the finger insertion direction proximal side) in two stages.

The bottom edge of the back surface plate 111 is joined to a front edge of the bottom plate 112, and the back surface plate 111 divides the area surrounded by the bottom plate 112 and the side plates 113*a* and 113*b* into front and back.

The space formed on the back side of the sunken back surface plate 111 becomes the X-direction movement stage housing 114 and the Y-direction movement stage housing 115 (see FIG. 1B).

An X-direction movement stage 45 of the drawing unit 40 is housed in the X-direction movement stage housing 114 when the drawing unit 40 is moved forward (toward the finger insertion direction proximal side).

A Y-direction movement stage 47 of the drawing unit 40 is disposed in the Y-direction movement stage housing 115.

The dividing wall 116 is provided inside the lower frame 11 so as to vertically divide the space on the front side inside the lower frame 11 (the space on the finger insertion direction proximal side surrounded by the back surface plate 111, the bottom plate 112, and the side plates 113*a* and 113*b*).

The dividing wall 116 is provided roughly horizontally, left and right edges of the dividing wall 116 are joined respectively to the side plates 113*a* and 113*b*, and a back edge of the dividing wall 116 is joined to the back surface plate 111.

A finger securing portion 30 (see FIG. 1B) is provided integrally in the lower frame 11.

The finger securing portion 30 is configured from a finger receiving portion 31 for receiving the finger corresponding to the nail T (i.e. the object) on which drawing will be applied (hereinafter referred to as "print finger U1"), and a finger clearing portion 32 for clearing fingers other than the print finger U1 (hereinafter referred to as "non-print fingers U2").

The finger receiving portion 31 is disposed on an upper side of the dividing wall 116 and, for example, slightly right of the center in a width direction of the lower frame 11.

The finger clearing portion 32 is constituted by the space on the lower side of the lower frame 11, partitioned by the dividing wall 116.

For example, in cases where performing a drawing on the nail T of a ring finger, the ring finger is inserted into the finger receiving portion 31 as the print finger U1, and the non-print fingers U2, namely the other four fingers (thumb, index finger, middle finger, and little finger) are inserted into the finger clearing portion 32.

As illustrated in FIGS. 1B and 2, the finger receiving portion 31 is open to a front surface side of the lower frame 11 (print finger insertion direction proximal side); and a bottom side is defined by a finger mount portion 116*a* that constitutes a portion of the dividing wall 116, a top side is defined by a ceiling portion 31*d*, left and right sides are defined by partitions 31*a* and 31*b*, and a rear side is defined by a partition 31*c*.

The finger mount portion 116*a* is a constituent where the finger (the print finger U1) of the nail T on which drawing is to be performed is mounted on the X-Y plane (mounting surface).

A window 31*e* is formed in the ceiling portion 31*d* for exposing the nail T of the print finger U1 inserted into the finger receiving portion 31.

A front wall 31*f* (see FIG. 1A) that closes the front surface side of the lower frame 11 is erected on the top surface of the dividing wall 116, at both end portions on the front surface side of the lower frame 11.

A pair of guide walls 31*g* (see FIG. 1A) that guides the print finger U1 into the finger receiving portion 31 is erected on the top surface of the dividing wall 116, and the pair of guide walls 31*g* narrows from the end of the front wall 31*f* on the center portion side toward the finger receiving portion 31.

A user can pinch the dividing wall 116 between the print finger U1 inserted in the finger receiving portion 31 and the non-print fingers U2 inserted in the finger clearing portion 32. Thus, the print finger U1 inserted in the finger receiving portion 31 is stably secured.

A test drawing portion 61 is provided on the top surface of the lower frame 11, beside the finger receiving portion 31 (location corresponding to a media access port 24 of the case body 2, on the left side in FIGS. 1A and 2 in the present embodiment). The test drawing portion 61 is for performing test drawing to eliminate fading and the like at a time of beginning of drawing by a pen tip (tip portion) 413 of the pen 41 (described hereinafter) within a drawable area of the drawing head 43 (described hereinafter).

The test drawing portion 61 is a flat portion and is configured so that drawing media (not illustrated) inserted through the media access port 24 of the case body 2 is mounted thereon.

The drawing media mounted on the test drawing portion 61 is not limited, provided that test drawing of the pen tip (tip portion) 413 can be performed, and for example, may be a piece of paper.

A pen standby unit (drawing tool standby unit) 62 is provided on the top surface of the lower frame 11, near the test drawing portion 61 (more to the apparatus proximal side than the test drawing portion 61 in the present embodiment; on the left side in FIG. 1B). The pen standby unit 62 is capable of holding at least one spare pen 41 at standby within the movable range of the drawing head 43 (described hereinafter).

In the present embodiment, the pen standby unit 62 is provided with one each of a standby holder 63 for holding a spare pen 41 at standby and a standby holder 63 for holding a pen 41 used in the drawing at standby when not drawing.

A cap 64 that stores the pen tip 413 of the pen 41 held at standby in the standby holder 63 is provided within the standby holder 63.

The cap 64 is formed, for example, from rubber, and prevents drying out of the pen tip 413 as a result of the pen tip 413 being stored in the cap 64.

The spare pen 41 in the present embodiment has the same type (same color) of pen tip 413 as the pen 41 used in the drawing, and is capable of performing drawing with the same type of ink as the pen 41 used in the drawing. That is, the spare pen 41 is a replacement for the pen 41 used in the drawing, and is used in cases where the pen 41 used in the drawing runs out of ink or is not capable of drawing due to dirtying, clogging, or the like of the pen tip 413.

Note that while not illustrated in the drawings, an ink jet maintenance portion 65 is provided on the top surface of the lower frame 11 across the finger receiving portion 31 on the side opposite the test drawing portion 61 and the pen standby unit 62 (the right side in FIGS. 1A and 2 in the present embodiment).

The ink jet maintenance portion 65 is configured from, for example, a cleaning mechanism for cleaning an ink discharging portion (nozzle surface) of the ink jet head 71 (described hereinafter), a cap mechanism for maintaining moist conditions of the ink discharging portion (nozzle surface), and the like (all not illustrated).

The drawing unit 40 is configured from and provided with the drawing head 43, a unit supporting member 44 that supports the drawing head 43, the X-direction movement stage 45 for moving the drawing head 43 in the X direction (the X direction in FIG. 1A; the left-right direction of the drawing apparatus 1), an X-direction movement motor 46, the Y-direction movement stage 47 for moving the drawing head 43 in the Y direction (the Y direction in FIG. 1B; the front-back direction of the drawing apparatus 1), a Y-direction movement motor 48, and the like.

As illustrated in FIGS. 1A and 1B, in the drawing head 43 of the present embodiment, a pen holding portion 42 (a drawing tool holding portion) detachably holding the pen 41 and an ink jet holder 72 detachably holding the ink jet head 71 are disposed adjacent to each other.

The ink jet holder 72 is configured to detachably hold at least one ink jet head 71 and, in the present embodiment, the drawing head 43 is provided with one ink jet holder 72 that holds one ink jet head 71.

The ink jet head 71 is, for example, an ink cartridge-integrated head in which ink cartridges storing yellow (Y), magenta (M), and cyan (C) ink are formed integrally with an ink discharging portion provided on a surface (in the present embodiment, the bottom surface in FIG. 1A and the like) facing the object (the nail T) in each of the ink cartridges.

The ink discharging portion is provided with a nozzle array consisting of a plurality of nozzles for discharging each color of ink. The ink jet head 71 micronizes the ink and performs the drawing on a target drawing surface by discharging the ink from a plurality of nozzles of a nozzle array of the ink discharging portion on the target drawing surface of the object (the nail T).

Note that the ink jet head 71 is not limited to those that discharge the three colors of ink described previously. The ink jet head 71 may further be provided with ink cartridges storing other ink and other ink discharging portions.

The pen holding portion 42 is configured to detachably hold at least one pen 41 and, in the present embodiment, the drawing head 43 is provided with one pen holding portion 42 that holds one pen 41.

The pen 41 is a drawing tool that has the surface of the nail T as its object surface, and performs a drawing on the nail T by the tip portion thereof being brought into contact with the object surface, namely the surface of the nail T.

As illustrated in FIG. 1A and the like, the pen 41 is provided with the pen tip 413 on a tip end side (the lower side in FIG. 1A) of a rod-like pen shaft portion 411 that is inserted through the interior of a hollow cylindrical pen holder 410.

An interior of the pen shaft portion 411 is an ink storing portion for storing various types of inks.

Any type of ink can be stored in the interior of the pen shaft portion 411. Viscosity of ink, diameter of the coloring particles (particle size), and the like are not particularly limited and, for example, ink containing metallic glitter, white ink, UV-curable ink, ink for gel nails, ink for under coats, ink for top coats, nail varnish, and the like can be used.

In the present embodiment, an example is described of a case where the pen 41 is a base layer pen in which white ink for use in base layer application is stored in the pen shaft portion 411.

In the present embodiment, the pen 41 is a ballpoint pen in which the pen tip 413 draws by the ink stored in the pen shaft portion 411 being dispensed by pressing the pen tip 413 against the surface of the nail T.

Note that the pen 41 is not limited to a ballpoint pen. For example, the pen 41 may be a felt-tip pen that draws by soaking ink into a felt-like pen tip, a brush pen that draws by soaking ink into a bundle of hairs, or the like. The pen 41 having the pen tip 413 of any desired thickness may be used.

The pen holding portion 42 holds and fixes one of the pen 41 by a retaining portion (not illustrated), and is a member for moving the pen 41 together with the drawing head 43.

In the present embodiment, the pen holding portion 42 is supported on a side portion of the drawing head 43.

The pen holding portion 42 is configured to be movable in the vertical direction by the driving of a pen vertical motor 426 (see FIG. 3) that is mounted on the drawing head 43.

The unit supporting member 44 is fixed to an X-direction movement portion 451 that is attached to the X-direction movement stage 45.

The X-direction movement portion 451 is configured to move in the X direction along guides (not illustrated) on the X-direction movement stage 45 via the driving of the X-direction movement motor 46. Thus, the drawing head 43 that is attached to the unit supporting member 44 is configured to move in the X direction (the X direction in FIG. 1A and the left-right direction of the nail printing apparatus 1).

The X-direction movement stage 45 is fixed to a Y-direction movement portion 471 of the Y-direction movement stage 47. The Y-direction movement portion 471 is configured to move in the Y direction along guides (not illustrated) on the Y-direction movement stage 47 via the driving of the Y-direction movement motor 48. Thus, the drawing head 43 that is attached to the unit supporting member 44 is configured to move in the Y direction (the Y direction in FIG. 1B and the front-back direction of the nail printing apparatus 1).

Note that in the present embodiment, the X-direction movement stage 45 and the Y-direction movement stage 47 are configured from combinations of the X-direction movement motor 46, the Y-direction movement motor 48, and ball screws and guides (not illustrated).

In the present embodiment, a head movement portion 49 is configured as an XY drive unit that drives the drawing head 43 provided with the pen 41 in the X direction and the Y direction via the X-direction movement motor 46, the Y-direction movement motor 48, and the like.

The pen vertical motor 426, the ink jet head 71, the X-direction movement motor 46, and the Y-direction movement motor 48 of the drawing unit 40 are connected to a drawing control portion 814 of a control device 80 (see FIG. 3; described hereinafter), and are configured to be controlled by the drawing control portion 814.

The imaging unit 50 is provided with the imaging device 51 and an illumination device 52.

The imaging unit 50 illuminates the nail T of the print finger U1, which is inserted into the finger receiving portion 31 and is exposed through the window 31*e* in the ceiling portion 31*d* of the upper portion, using the illumination device 52. Moreover, the print finger U1 exposed through the window 31*e* is imaged by using the imaging device 51 and, a captured image of the nail T of the print finger U1 (image of finger including nail image, see FIG. 4), namely image data of a nail image is acquired.

In the present embodiment, the imaging device 51 and the illumination device 52 are fixed on a side (the right side of the drawing head 43 in FIG. 1A) of the drawing head 43 of the drawing unit 40.

Specifically, as illustrated in FIGS. 1A and 1B, the drawing head 43 of the drawing unit 40 has an overhanging portion 401 overhanging in a lateral direction from a first edge (the right side in FIG. 1A) of the top surface of the drawing head 43, and a substrate 53 is attached to the overhanging portion 401. The imaging device 51 and the illumination device 52 constituting the imaging unit 50 are provided on a bottom surface of the substrate 53 so as to face the dividing wall 116.

Note that a size of the substrate 53 and positions where the imaging device 51 and the illumination device 52 are attached to the substrate 53 are not particularly limited.

The imaging device 51 is, for example, a small camera having a solid state image sensor with a pixel count of about 2 million pixels or greater, a lens, and the like.

In the present embodiment, a drawing condition determination portion 815 (described hereinafter, see FIG. 3) determines a drawing condition of an region Fa of the nail T of the print finger U1 where drawing was applied by the pen 41, on the basis of the image data of the captured image (the nail image) acquired by the imaging unit 50.

The nail shape detection portion 812 detects a position of the nail T on the X-Y plane, a vertical position of the nail T, and other nail information on the basis of the image data of the captured images (the nail images).

Note that the imaging unit 50 is preferably configured to be moved by the head movement portion 49 so as to image the nail T from mutually different positions and angles by using the imaging device 51, and acquire image data of a plurality of captured images (nail images) and, thereby, detect the curvature and the like of the nail T of the print finger U1.

In cases where the imaging unit 50 acquires a plurality of image data of captured images (nail images), the nail shape detection portion 812 (see FIG. 3) can detect the curvature of the nail T on the basis of the image data of this plurality of captured images (nail images).

The illumination device 52 is, for example, a white LED or similar light source.

The illumination device 52 radiates light downward and illuminates at least an imaging area below the imaging device 51. The position of the illumination device 52 with respect to the imaging device 51 is fixed.

Note that the disposal, the number, and the like of the illumination devices 52 are not limited to the illustrated examples.

The imaging unit 50 is connected to an imaging control portion 811 of the control device 80 (described hereinafter, see FIG. 3), and is configured to be controlled by the imaging control portion 811.

Note that image data of the captured images acquired by the imaging unit 50 are stored in a nail image memory region 821 of a memory unit 82 (described hereinafter).

The control device 80 is, for example, arranged on a substrate 13 or the like disposed in the upper frame 12.

Figure 3:
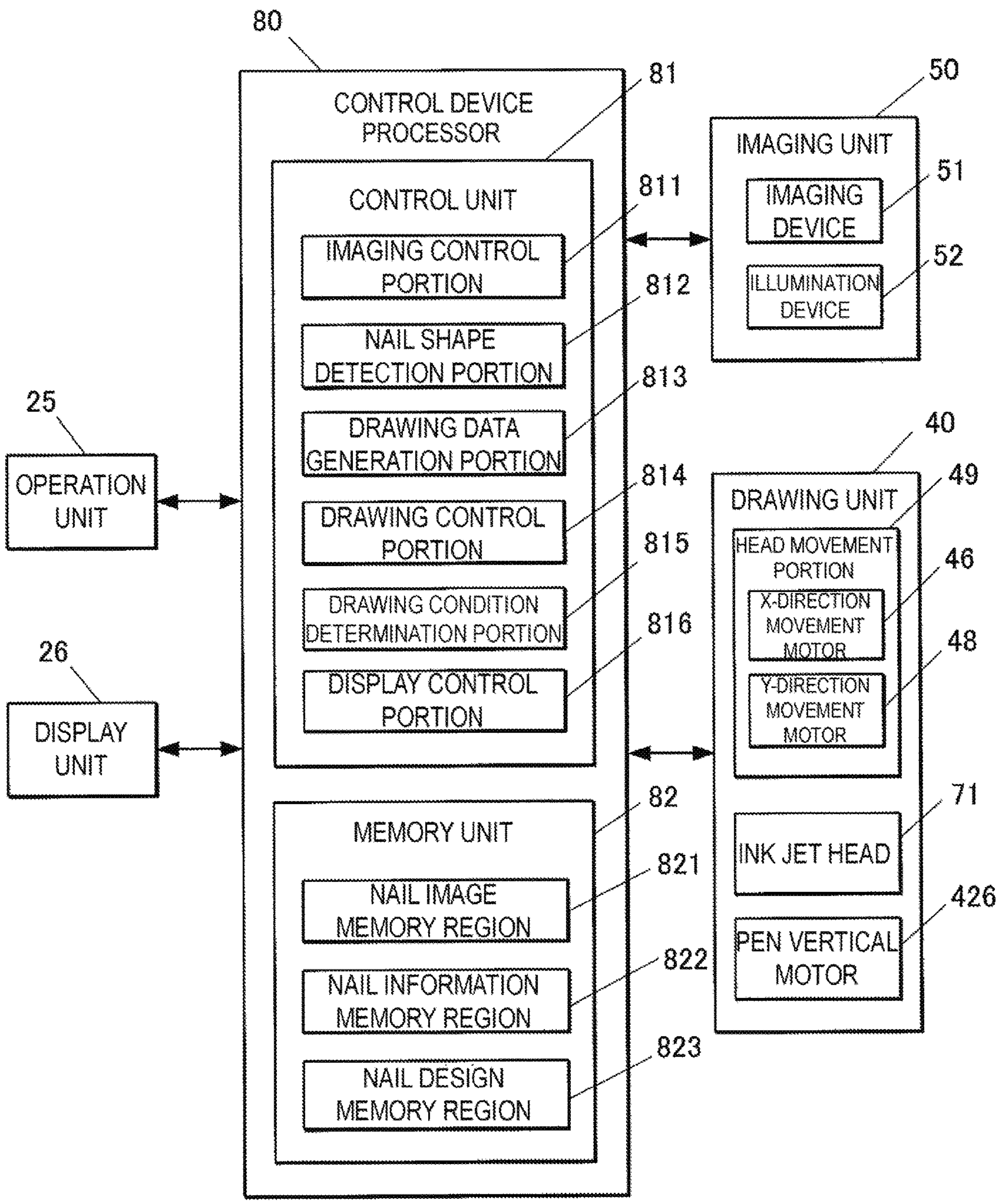
FIG. 3 is a main constituent block diagram showing a control configuration of the drawing apparatus according to the first embodiment.

FIG. 3 is a main constituent block diagram showing the control configuration according to the present embodiment.

As illustrated in FIG. 3, the control device 80 is a processor (a computer) provided with a control unit 81 constituted by a central processing unit (CPU), and a memory unit 82 constituted by a read only memory (ROM), a random access memory (RAM), and the like.

Various programs to operate the nail printing apparatus 1, various data, and the like are stored in the memory unit 82.

Specifically, various programs are stored in the ROM of the memory unit 82 such as a drawing condition determination program for determining the drawing condition on the nail T from the nail images (the captured images); a nail information detection program for detecting various types of nail information such as curvature in the width direction of the nail T, the width of the nail T, the area of the nail T, and the like from the nail images (the captured images); a drawing data generation program for generating drawing data; a drawing program for performing drawing processing; and the like. A configuration is provided whereby these programs are executed by the control device 80 and, thus, the components of the nail printing apparatus 1 are controlled in an integrated manner.

In the present embodiment, the memory unit 82 is provided with the nail image memory region 821 where the image data of the nail images (the captured images) of the nail T of the print finger U1 of a user acquired by the imaging unit 50 are stored, a nail information memory region 822 where the nail information (the outline indicating the shape of the nail T, the curvature of the nail T, and the like) detected by the nail shape detection portion 812 is stored, a nail design memory region 823 where image data of nail designs to be drawn on the nail T are stored, and the like.

When viewed from a function perspective, the control unit 81 is provided with the imaging control portion 811, the nail shape detection portion 812, a drawing data generation portion 813, the drawing control portion 814, the drawing condition determination portion 815, a display control portion 816, and the like.

Functions of the imaging control portion 811, the nail shape detection portion 812, the drawing data generation portion 813, the drawing control portion 814, the drawing condition determination portion 815, the display control portion 816, and the like are realized by cooperation of the CPU of the control unit 81 and the programs stored in the ROM of the memory unit 82.

The imaging control portion 811 is configured to cause the imaging device 51 to image finger images, that is, nail images (captured images, see FIG. 4A) including images of the nail T of the print finger U1 inserted into the finger receiving portion 31, by controlling the imaging device 51 and the illumination device 52 of the imaging unit 50; and cause the imaging unit 50 to acquire the image data of the nail images (captured images).

In the present embodiment, while the imaging unit 50 is moved by the drawing control portion 814 that controls the head movement portion 49, the imaging control portion 811 causes the imaging device 51 to image the nail T from a plurality of mutually different positions and angles in the width direction of the nail T (e.g. directly above the nail T and diagonally above the nail T, or the like), and capture a plurality of the nail images (captured images).

Note that the number of captured images acquired for one nail T is not particularly limited. However, it is preferable that two or more captured images be captured from mutually different positions in the width direction of the nail T because it will be possible to perform accurate detection, including the detection of the curvature of the nail T.

In the present embodiment, upon completion of the drawing by the pen 41 held in the pen holding portion 42, the imaging control portion 811 causes the imaging device 51 to image the print finger U1 on which the drawing has been performed, and causes the imaging unit 50 to acquire image data of a determination-use nail image (see FIGS. 4D and 4E) for the determination by the drawing condition determination portion 815 of the drawing condition of the region Fa.

The image data of the nail image acquired by the imaging unit 50 is stored in the nail image memory region 821 of the memory unit 82.

The nail shape detection portion 812 is configured to detect the nail information on the nail T of the print finger U1 on the basis of the image data of the images (captured images) of the nail T of the print finger U1 inserted into the finger receiving portion 31, the images being imaged by the imaging device 51.

In the present embodiment, the nail shape detection portion 812 detects the contour shape of the nail T as the nail information, on the basis of the image data of the captured images (nail images).

Note that the nail information acquired by the nail shape detection portion 812 is not limited to the contour shape of the nail T. For example, the nail information may include the X-Y coordinates of the horizontal position of the nail T, the height of the nail T (position in the vertical direction of the nail T, hereinafter referred to as the "vertical position of the nail T" or simply the "position of the nail T"), the shape along the width direction of the nail T, that is, the inclination angle with respect to the X-Y plane of the surface of the nail T (the curvature of the nail T or the inclination angle of the nail T), and the like.

The nail information acquired by the nail shape detection portion 812 is stored in the nail information memory region 822 of the memory unit 82.

The drawing data generation portion 813 establishes a drawing target area Ta (see FIG. 4B and the like), and generates drawing data for the drawing to be applied by the drawing head 43 to the nail T of the print finger U1, on the basis of the nail information detected by the nail shape detection portion 812.

Specifically, on the basis of the shape of the nail T (the contour shape) and the like detected by the nail shape detection portion 812, the drawing data generation portion 813 performs calibration processing, such as enlarging, reducing, and cropping of the image data of the nail design, for calibrating the nail design to the shape of the nail T.

Here, a case is illustrated in which the entire surface of the nail T is the region Fa to be filled in by using the pen 41. Note that the region Fa is not limited to cases where configured as the entire surface of the nail T. The region Fa may be a portion of the surface of the nail T, and is appropriately set depending on the design image to be drawn on the nail T.

In the present embodiment, in case where the drawing condition determination portion 815 (described hereinafter) has determined that an undrawn area Ra (see FIG. 4E and the like) where the ink has not been applied is present within the drawing-processed region Fa (see FIG. 4D and the like), drawing data is generated for performing drawing in the undrawn area Ra.

The drawing data generation portion 813 functions as an image data correction portion that performs appropriate curvature correction on the image data of the nail design specified to be drawn on the nail T, in accordance with the curvature of the nail T detected by the nail shape detection portion 812.

As a result, drawing data for the nail design to be drawn by the pen 41 or the ink jet head 71 is generated.

The drawing control portion 814 is a control portion that outputs control signals to the drawing unit 40 on the basis of the drawing data generated by the drawing data generation portion 813, and controls the actions of the X-direction movement motor 46, the Y-direction movement motor 48, the pen vertical motor 426, the ink jet head 71, and the like of the drawing unit 40, so as to perform a drawing on the nail T that corresponds with the drawing data.

In the present embodiment, in cases where the drawing condition determination portion 815 has determined that the undrawn area Ra is present within the drawing-processed region Fa, the drawing control portion 814 controls the actions of the drawing unit 40 and causes the drawing unit 40 to perform a replacement operation in which the pen 41 held in the pen holding portion 42 is replaced with the spare pen 41 held in standby in the pen standby unit 62 by returning the pen 41 presently held in the pen holding portion 42 to the pen standby unit 62 and placing the spare pen 41 held in standby in the pen standby unit 62 in the pen holding portion 42.

Specifically, the drawing control portion 814 causes the X-direction movement motor 46 and the Y-direction movement motor 48 to operate and move the drawing head 43 so that the pen holding portion 42 holding the pen 41 is moved to a position corresponding to an empty standby holder 63 (the apparatus proximal side in the present embodiment, that is, the standby holder 63 on the lower side in FIG. 2) among the pen standby units 62. Then, the drawing control portion 814 causes the pen vertical motor 426 to operate and store the pen 41 held in the pen holding portion 42 in the empty standby holder 63.

Then, the drawing control portion 814 causes the drawing head 43 to move so that the pen holding portion 42 is moved to a position corresponding to a standby holder 63 holding the spare pen 41 (the apparatus back side in the present embodiment, that is, the standby holder 63 on the upper side in FIG. 2) among the pen standby units 62. Then, the drawing control portion 814 causes the pen vertical motor 426 to operate and acquire the spare pen 41 from the standby holder 63, and this pen 41 is placed in pen holding portion 42.

Furthermore, upon completion of the replacement (exchanging) with the new pen 41, the drawing control portion 814 again causes the X-direction movement motor 46 and the Y-direction movement motor 48 to operate and move the drawing head 43 so that the pen 41 is moved to a position above the undrawn area Ra of the nail T. Then, the drawing control portion 814 causes a drawing to be performed in the undrawn area Ra by using the replaced spare pen 41.

The drawing condition determination portion 815 is configured to determine the drawing condition of the region Fa in which drawing has been applied by using the pen 41.

In the present embodiment, a configuration is provided in which, upon the drawing being performed by the pen 41 held in the pen holding portion 42, the imaging unit 50 acquires image data of the determination-use nail image (see FIGS. 4D and 4E) for the determination of the drawing condition of the region Fa drawn by using the pen 41.

The drawing condition determination portion 815 determines whether or not the undrawn area Ra (see FIG. 4E) is present within the region Fa, on the basis of the image data of the determination-use nail image.

The method of determination by the drawing condition determination portion 815 is not particularly limited and, for example, determination may be performed on the basis of the drawing data. Specifically, color information of the finish of a case where the drawing has been performed may be stored in the memory unit 82 or the like in advance, and this color information may be compared with the color in the nail image actually captured.

Figure 4A:
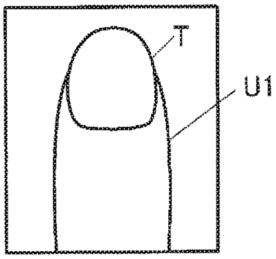
FIG. 4A is an example of a nail image.
Figure 4E:
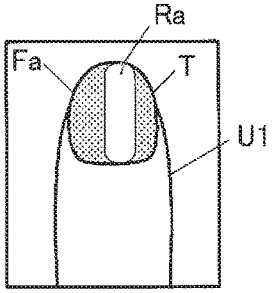
FIG. 4E is an example of a nail image illustrating a condition where an unpainted area has occurred.
Figure 4B:
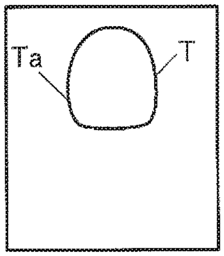
FIG. 4B is an example of a drawing target area.
Figure 4F:
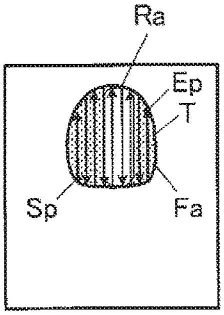
FIG. 4F is a drawing illustrating a relationship between the unpainted area and the drawing direction when the drawing was applied.
Figure 4C:
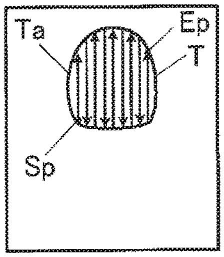
FIG. 4C is a drawing illustrating an example of a drawing direction when applying a drawing to the drawing target area.
Figure 4G:
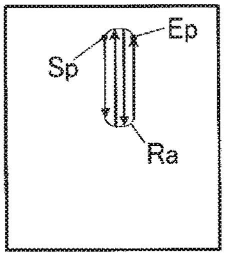
FIG. 4G is a drawing illustrating a relationship between the unpainted area and the drawing direction in a case where the unpainted area is drawn in the same direction as before.
Figure 4D:
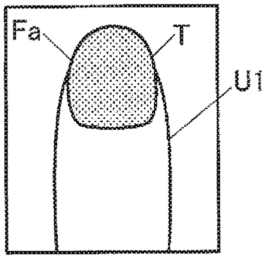
FIG. 4D is an example of a nail image illustrating a condition where a base layer has been applied without unpainted areas.

For example, as illustrated in FIG. 4D, if the predetermined ink is applied on the entire nail T, the drawing condition determination portion 815 determines that the undrawn area Ra is not present within the region Fa.

On the other hand, as illustrated in FIG. 4E, in cases where a portion is present where the predetermined ink is not applied within the region Fa of the nail T, the drawing condition determination portion 815 determines that the undrawn area Ra is present.

The display control portion 816 is configured to control the display unit 26 to cause the display unit 26 to display various display screens.

In the present embodiment, examples of the various types of display screens the display control portion 816 is configured to display on the display unit 26 include nail design selection screens and thumbnail images for confirming designs, nail images acquired by imaging the print finger U1, various command screens, operation screens, and the like.

In the present embodiment, in cases where the undrawn area Ra cannot be drawn by the spare pen 41, the display control portion 816 is configured to cause the display unit 26 to function as notification means for notifying a user of the situation and displaying a message or the like prompting that the pen 41 be replaced with a different pen 41.

Next, a drawing method by the nail printing apparatus (the drawing apparatus) according to the present embodiment is described while referencing FIGS. 4A to 4H and FIG. 5.

In cases where performing drawing by using the nail printing apparatus 1, a user first operates a power switch to turn on the control device 80.

The display control portion 816 displays a design selection screen on the display unit 26.

The user operates operation buttons or the like on the operation unit 25 and selects a desired nail design from among a plurality of nail designs displayed on the design selection screen.

As a result, a selection command signal is output from the operation unit 25 and the nail design intended to be drawn on the nail T is selected.

Next, the user inserts the print finger U1 into the finger receiving portion 31, inserts the non-print fingers U2 into the finger clearing portion 32, and operates a drawing switch (not illustrated) of the operation unit 25, thereby securing the print finger U1 within the finger receiving portion 31 (step S1).

Upon input of a command from the draw switch and before starting the drawing operations, first, the drawing control portion 814 controls the head movement portion 49 and causes the imaging unit 50 to move to a predetermined imaging position, the print finger U1 to be imaged, and the image data of the nail images (captured images, see FIG. 4A) to be acquired (step S2).

Upon acquisition of the image data of the nail images (captured images), the nail shape detection portion 812 detects the outline shape, namely the contour shape, of the nail T (e.g. see FIG. 4B), on the basis of the nail images (the captured images).

The nail shape detection portion 812 detects the curvature of the nail T and other nail information on the basis of the image data of the nail images (the captured images) (step S3).

Next, the drawing data generation portion 813 establishes the drawing target area Ta for a first pen 41 (specifically, the pen 41 presently held in the pen holding portion 42 as the pen 41 for drawing the nail design selected by the user), on the basis of the nail information detected by the nail shape detection portion 812 (step S4).

For example, in cases where base layer ink is to be applied to the entire nail T, all areas of the nail T are established as the drawing target area Ta (e.g. see FIG. 4B).

Then, the drawing data generation portion 813 performs correction such as appropriate curvature correction and the like on the image data and generates drawing data of the nail design.

Upon generation of the drawing data, the drawing control portion 814 outputs the drawing data to the drawing unit 40, and the drawing is performed on the nail T by the first pen 41 while the drawing control portion 814 operates the head movement portion 49 and causes the drawing head 43 to move appropriately (step S5).

The manner of the drawing is not particularly limited. For example, as illustrated in FIG. 4C, the drawing target area Ta is filled in while moving the first pen 41 along a drawing direction that consecutively switches back and forth along an extending direction of the nail T, from a starting point Sp to an end point Ep.

Upon completion of the drawing by the first pen 41, the imaging unit 50 images the print finger U1 and acquires image data of determination-use nail images (captured images, see FIGS. 4D and 4E) for determining the drawing condition (step S6).

The drawing condition determination portion 815 determines whether or not an undrawn area Ra is present in the region Fa, on the basis of the image data of the determination-use nail image (step S7).

For example, as illustrated in FIG. 4D, in a case where the region Fa is an area intended to be filled in and, in the determination-use nail image, the entire region Fa is filled in, the drawing condition determination portion 815 determines that an undrawn area Ra is not present in the region Fa (step S7; NO).

In this case, drying of the nail T of the finger for which the drawing has been completed is performed by using drying means such as a dryer or the like (not illustrated) (step S8).

Then, the drawing data generation portion 813 generates drawing data for the ink jet head 71 (step S9).

Then, the drawing control portion 814 controls the operation of the drawing unit 40 on the basis of this drawing data to perform drawing processing by the ink jet head 71 (step S10).

Then, the drying operation is performed again (step S11), and after drying for a predetermined amount of time necessary to complete the drying, the securing of the print finger U1 is released and the drawing processing is completed (step S12).

On the other hand, as illustrated in FIG. 4E, in a case where the region Fa is the region intended to be filled in and, in the determination-use nail image, the undrawn area Ra where application has not been performed is present in the region Fa, the drawing condition determination portion 815 determines that the undrawn area Ra is present. In cases where the drawing condition determination portion 815 has determined that an undrawn area Ra is present (step S7; YES), the undrawn area Ra is set as a drawing target area for a second pen 41 (specifically, in the present embodiment, the spare pen 41 held in standby in the pen standby unit 62) (step S13).

Then, drawing processing is performed for this area by using the second pen 41 (step S14).

Figure 4H:
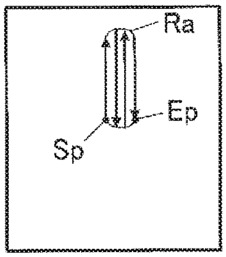
FIG. 4H is a drawing illustrating a relationship between the unpainted area and the drawing direction in a case where the unpainted area is drawn in a different drawing direction than before.

When drawing the undrawn area Ra, as illustrated in FIG. 4G, the drawing control portion 814 may control the drawing unit 40 to perform the drawing while moving the second pen 41 along the same drawing direction as when drawing by using the first pen 41 (see FIGS. 4C and 4F); or as illustrated in FIG. 4H, may control the drawing unit 40 to perform the drawing while moving the second pen 41 along a drawing direction different from that of the previous drawing (that is, the drawing performed prior to this drawing) from the starting point Sp to the end point Ep.

In some cases, the spreading of the ink may change as a result of changing the drawing direction that the pen moves in to draw, depending on the condition and the like of the surface of the nail T. As such, the possibility of correctly performing the drawing in the undrawn area Ra increases as a result of moving the pen along a direction different from that of the previous drawing.

Then, the print finger U1 is imaged again and image data of the determination-use nail images (captured images, see FIGS. 4D and 4E) is acquired (step S15).

The drawing condition determination portion 815 determines whether or not the undrawn area Ra is present (step S16).

In cases where the drawing condition determination portion 815 has determined that the undrawn area Ra is not present (step S16; NO), step S8 is returned to and the processing of steps S8 to S12 is carried out.

On the other hand, in cases where the drawing condition determination portion 815 determines that the undrawn area Ra is present (step S16; YES), the display unit 26 is caused to notify that the drawing could not be performed and display a message or the like prompting the user to replace the pen 41 with a different pen 41 (step S17).

Then, the securing of the print finger U1 is released (step S12) and the drawing processing is canceled.

Note that in the preceding, an example is given of a case where there is only one region Fa. However, in cases where there are a plurality of regions Fa, after the drying operation of step S11 is performed, step S4 is returned to, a different undrawn drawing target area Ta is established, and the same series of processing as before is carried out.

In cases where there is only one region Fa, the series of drawing operations described above is performed on the nail T of one finger and, thereafter, the same series of drawing operations is performed on the nails T of the other fingers.

Either the first pen 41 or the second pen 41 may be used in the drawing operations.

Note that in some cases where an undrawn area Ra occurs with the first pen 41, it is possible that the undrawn area Ra will not occur with the second pen 41 after the first pen 41 has been replaced with the second pen and drawing is performed in the undrawn area Ra. In such a case, if the first pen is used again, there is a possibility of a reoccurrence of the undrawn area Ra. As such, in this case, it is preferable that the second pen 41 be used and it is also preferable that the first pen 41 be inspected for abnormalities and/or replaced with a different pen 41 of the same type.

Accordingly, in cases where an undrawn area Ra occurs with the first pen 41, and the first pen 41 is replaced with the second pen 41 and drawing is performed in the undrawn area Ra, this information is stored in the memory unit 82. Moreover, in cases where the first pen 41 is to be used again for the drawing, before use, the display unit 26 may be caused to display a message prompting the confirmation of abnormalities in the first pen 41 or a message prompting the replacement of the first pen 41, on the basis of the information stored in the memory unit 82 and, thereby, prompt the user to confirm and/or replace the first pen 41.

As described above, according to the present embodiment, the drawing condition determination portion 815 determines the drawing condition of the drawing-processed region Fa where drawing has been applied by the pen 41. Moreover, in cases where the drawing condition determination portion 815 has determined that an undrawn area Ra is present within the region Fa, the drawing control portion 814 controls the drawing unit 40 to carry out replacement operations in which the pen 41 held in the pen holding portion 42 is replaced with the spare pen 41 held in standby in the pen standby unit 62, and perform a drawing in the undrawn area by using the replaced spare pen 41.

As a result, the undrawn area Ra can be eliminated and nail printing with a beautiful finish can be performed.

In cases such as in the present embodiment where a base layer is applied to the nail T, the drawing processing will not advance to the next step, such as drawing of a design by the ink jet head 71 while the undrawn area Ra is present in the base layer. As a result, the finish quality of the nail printing can be improved.

In some cases, the spreading of the ink may change as a result of changing the drawing direction that the pen moves in to draw, depending on the condition and the like of the surface of the nail T. In the present embodiment, the drawing direction in which the second pen 41 is move in to perform the drawing in the undrawn area Ra by using the second pen 41 is different from the drawing direction in which the first pen 41 move in to perform the drawing by using the first pen 41. In such a case, there is a possibility that the cause of the non-drawing will be resolved and, as a result, the possibility of the drawing in the undrawn area Ra being performed correctly improves.

Second Embodiment

Next, a second embodiment of the drawing apparatus and drawing method according to the present invention are described below while referring to FIGS. 6 and 7.

Note that the present embodiment differs from the first embodiment only on the point of the configuration of the spare pen 41 held in standby in the pen standby unit 62. As such, in the following, points that particularly differ from the first embodiment will be described.

Figure 6:
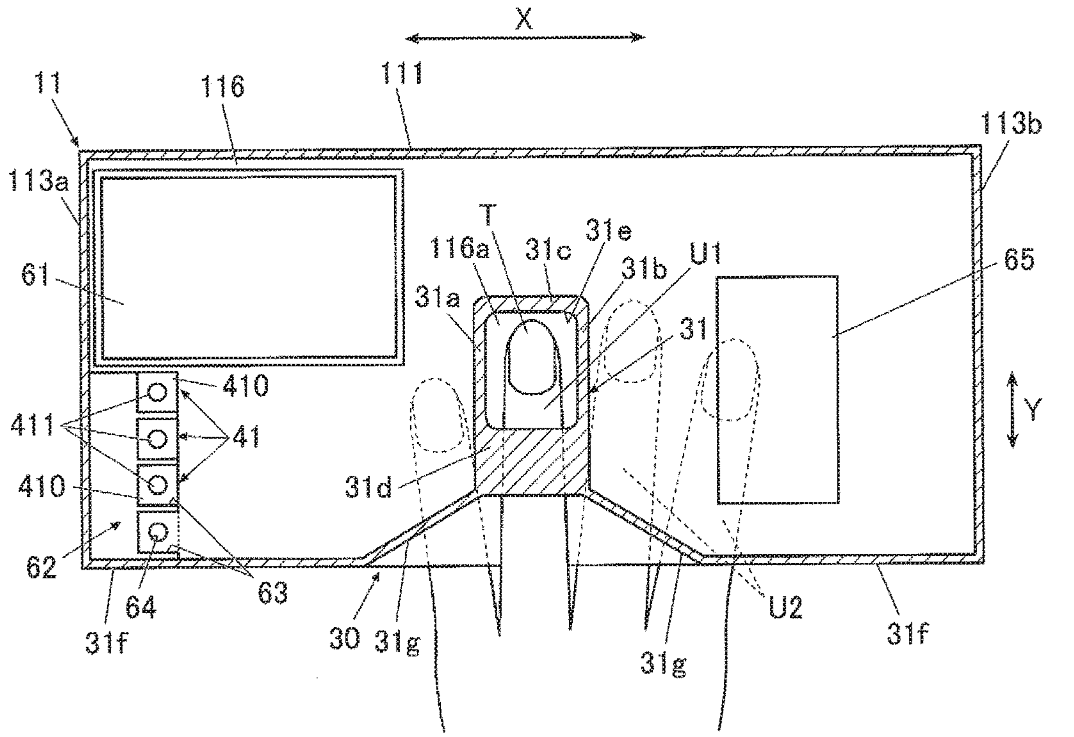
FIG. 6 is a plan view illustrating an upper surface of a dividing wall in a second embodiment.

FIG. 6 is a plan view of a dividing wall of the nail printing apparatus (drawing apparatus) in the present embodiment.

As illustrated in FIG. 6, four standby holders 63 are provided in the pen standby unit 62 of the present embodiment. Specifically, in addition to the pen 41 (first pen 41) presently held in the pen holding portion 42 of the drawing head 43, three types of the pens 41 are held in standby in the pen standby unit 62 as spare pens 41 (second pen 41 to fourth pen 41).

In the present embodiment, the spare pens 41 held in standby in the pen standby unit 62 include a spare pen 41 (the second pen 41) that has the same type of pen tip 413 and ink as the first pen 41 held in the pen holding portion 42 and used in the drawing, a spare pen 41 (the third pen 41) in which the type of pen tip 413 differs from that of the first pen 41, and a spare pen 41 (the fourth pen 41) in which the type of ink differs from that of the first pen 41.

Of these, the third pen 41, in which the type of pen tip 413 differs from that of the first pen 41, has a pen tip 413 that is narrower in diameter than that of the first pen 41.

In cases where an undrawn area Ra occurs when drawing has been performed by using the first pen 41, one cause of the occurrence of the undrawn area Ra is thought to be that the ink was not able to be spread on the surface of the nail T when drawing is performed on a fine portion of the nail T, due to the pen tip 413 being thick.

In this case, it is possible to eliminate the occurrence of the undrawn area Ra by changing the pen 41 to a pen 41 with a narrow pen tip 413 and then attempting drawing.

The fourth pen 41, in which the type of ink differs from that of the first pen 41, draws by using ink of a lower viscosity than that of the ink of the first pen 41.

Specifically, for example, the viscosity of the ink is lowered by increasing the amount of solvent.

In cases where an undrawn area Ra occurs when drawing has been performed by using the first pen 41, one cause of the occurrence of the undrawn area Ra is thought to be that the drawing could not be performed due to the condition of the surface of the nail T, which causes the highly viscous ink to not spread easily.

In this case, it is possible to eliminate the occurrence of the undrawn area Ra by changing the pen 41 to a pen 41 by using a low viscosity ink and then attempting drawing.

The order of performing drawing in the undrawn area Ra is not particularly limited to the order of the first pen 41, the second pen 41, the third pen 41, and then the fourth pen 41.

However, in cases where eliminating the occurrence of the undrawn area Ra, in order to prevent the finish quality of the nail printing from being affected as much as possible, it is preferable that configurations of the pens 41 be changed in a manner whereby the finish is affected as little as possible and then drawing be attempted; and it is preferable that drawing be attempted as described previously, in order from the first pen 41 to the fourth pen 41.

Other configurations are the same as in the first embodiment and, as such, the same constituents are marked with the same reference numerals and descriptions thereof are omitted.

Figure 7:
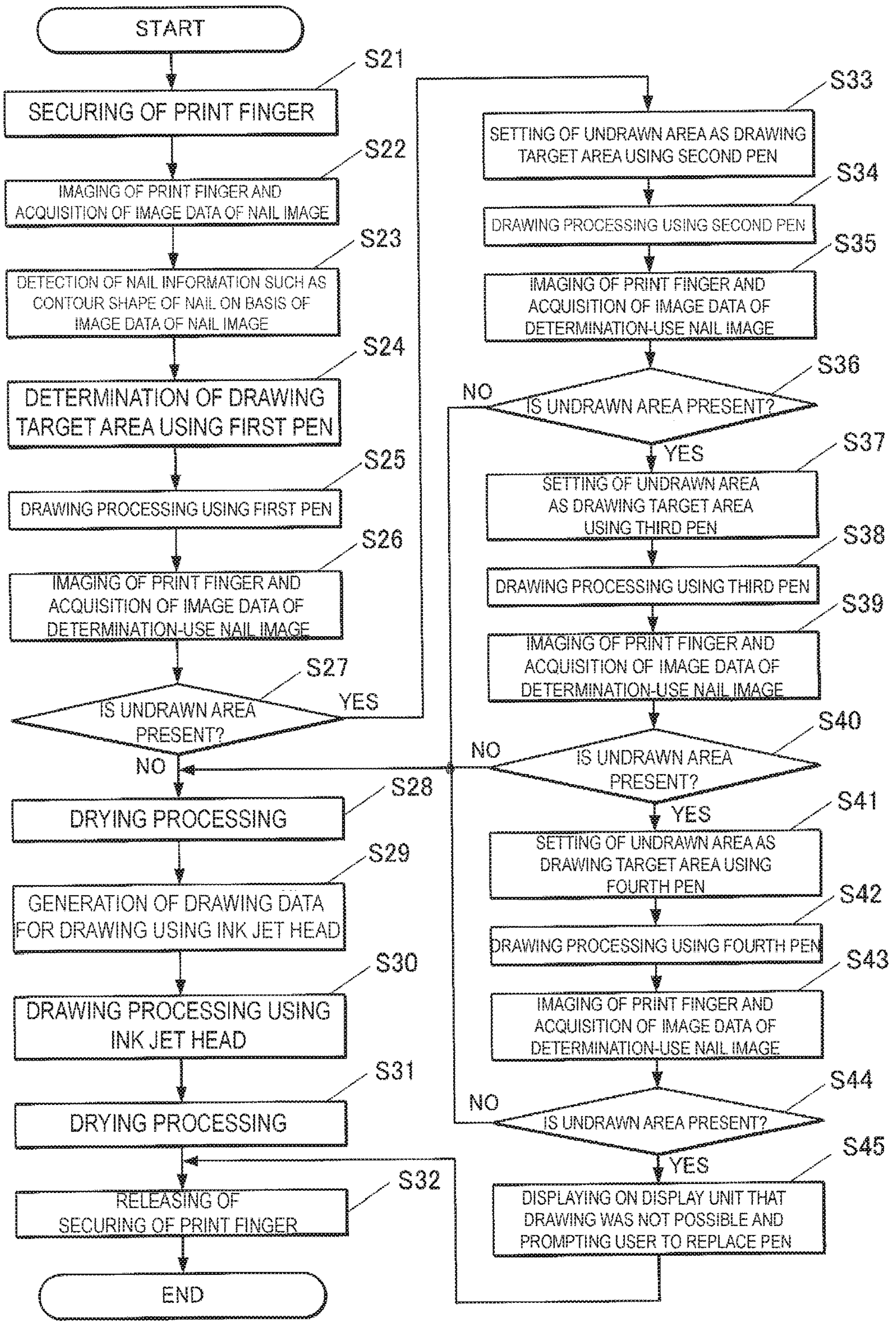
FIG. 7 is a flowchart showing drawing processing of the drawing apparatus of the second embodiment.

Next, a drawing method by the nail printing apparatus (the drawing apparatus) according to the present embodiment is described while referencing FIG. 7.

Figure 5:
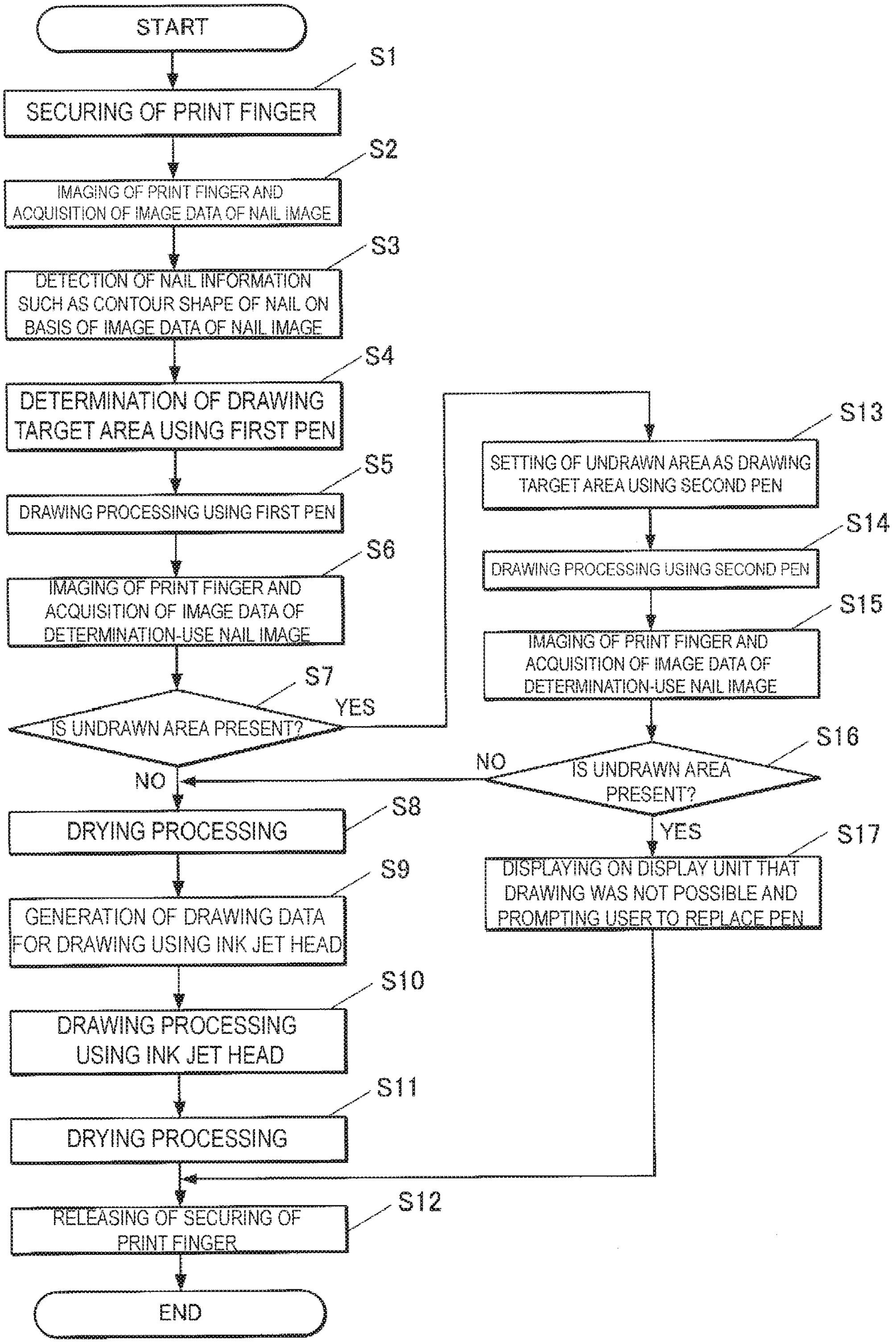
FIG. 5 is a flowchart showing drawing processing of the drawing apparatus of the first embodiment.

Note that step S21 to step S32 in FIG. 7 are the same as step S1 to step S12 in FIG. 5 of the first embodiment and, therefore, descriptions thereof are omitted.

In cases where the drawing condition determination portion 815 has determined that an undrawn area Ra is present in step S27 (step S27; YES), the undrawn area Ra is set as a drawing target area for the second pen 41 (specifically, in the present embodiment, of the spare pens 41 held in standby in the pen standby unit 62, the second pen 41 that has the same pen tip 413 and ink as the first pen 41) (step S33).

Then, drawing processing is performed for this area by using the second pen 41 (step S34).

As in the first embodiment, when drawing in the undrawn area Ra, as illustrated in FIG. 4G, the drawing control portion 814 may control the drawing unit 40 to perform the drawing by moving the second pen 41 along the same drawing direction as when drawing by using the first pen 41 (see FIGS. 4C and 4F); or as illustrated in FIG. 4H, may control the drawing unit 40 to perform the drawing by moving the second pen 41 along a drawing direction different from that of the previous drawing (that is, the drawing performed prior to this drawing) from the starting point Sp to the end point Ep.

Depending on the condition of the surface of the nail T and the like, there are cases where the spreading of the ink may change as a result of changing the drawing direction. As such, the possibility of correctly performing the drawing in the undrawn area Ra increases by moving the pen along a direction different from that of the previous drawing.

Then, the print finger U1 is imaged again and image data of the determination-use nail images (captured images, see FIGS. 4D and 4E) is acquired (step S35), and the drawing condition determination portion 815 determines whether or not the undrawn area Ra is present (step S36).

In cases where the drawing condition determination portion 815 has determined that the undrawn area Ra is not present (step S36; NO), step S28 is returned to and the processing of steps S28 to S32 is carried out.

On the other hand, in cases where the drawing condition determination portion 815 has determined that the undrawn area Ra is present (step S27; YES), the undrawn area Ra is set as a drawing target area for the third pen 41 (specifically, in the present embodiment, of the spare pens 41 held in standby in the pen standby unit 62, the third pen 41 that has a different pen tip 413 than the first pen 41) (step S37).

Then, drawing processing is performed for this area by using the third pen 41 (step S38).

When drawing in the undrawn area Ra, as illustrated in FIG. 4G, as before, the drawing control portion 814 may control the drawing unit 40 to perform the drawing while moving the third pen 41 along the same drawing direction as when drawing by using the first pen 41 (see FIGS. 4C and 4F); or as illustrated in FIG. 4H, may control the drawing unit 40 to perform the drawing while moving the third pen 41 along a drawing direction different from that of the previous drawing (that is, the drawing performed prior to this drawing).

Then, the print finger U1 is imaged again and image data of the determination-use nail images (captured images, see FIGS. 4D and 4E) is acquired (step S39), and the drawing condition determination portion 815 determines whether or not the undrawn area Ra is present (step S40).

In cases where the drawing condition determination portion 815 has determined that the undrawn area Ra is not present (step S40; NO), step S28 is returned to and the processing of steps S28 to S32 is carried out.

On the other hand, in cases where the drawing condition determination portion 815 has determined that the undrawn area Ra is present (step S40; YES), the undrawn area Ra is also set as a drawing target area for the fourth pen 41 (specifically, in the present embodiment, of the spare pens 41 held in standby in the pen standby unit 62, the fourth pen 41 that has a different type of ink than the first pen 41) (step S41).

Then, drawing processing is performed for this area by using the fourth pen 41 (step S42).

When drawing in the undrawn area Ra, as illustrated in FIG. 4G, as before, the drawing control portion 814 may control the drawing unit 40 to perform the drawing while moving the fourth pen 41 along the same drawing direction as when drawing by using the first pen 41 (see FIGS. 4C and 4F); or as illustrated in FIG. 4H, may control the drawing unit 40 to perform the drawing while moving the fourth pen 41 along a drawing direction different from that of the previous drawing (that is, the drawing performed prior to this drawing).

Then, the print finger U1 is imaged again and image data of the determination-use nail images (captured images, see FIGS. 4D and 4E) is acquired (step S43), and the drawing condition determination portion 815 determines whether or not the undrawn area Ra is present (step S44).

In cases where the drawing condition determination portion 815 has determined that the undrawn area Ra is not present (step S44; NO), step S28 is returned to and the processing of steps S28 to S32 is carried out.

On the other hand, in cases where the drawing condition determination portion 815 determines that the undrawn area Ra is present (step S44; YES), the display unit 26 is caused to notify that the drawing could not be performed by using any of the pens 41 and display a message or the like prompting the user to replace the pens 41 with different pens 41 (step S45).

Then, the securing of the print finger U1 is released (step S32) and the drawing processing is canceled.

Other aspects of the present embodiment are the same as in the first embodiment and, as such, descriptions thereof are omitted.

As described above, according to the present embodiment, in addition to the same benefits as in the first embodiment being obtained, the following additional benefits can be obtained.

That is, in the present embodiment, in cases where a plurality of types of the spare pens 41 is held in standby in the pen standby unit 62 and it is determined that the undrawn area Ra is present in the region Fa, drawing is attempted consecutively by using different types of pens 41.

There are various causes for the occurrence of an undrawn area Ra in the region Fa of the nail T. When the cause is that the pen 41 has run out of ink or that the pen tip has become dirty or clogged, the cause of the non-drawing can be resolved by replacing the pen 41 with a new pen 41 (the second pen 41 of the present embodiment). However, when the cause of the non-drawing is due to the condition of the surface of the nail T or the like and not attributable to the pen 41, it is highly unlikely that the non-drawing will be resolved by replacing the pen 41 with a pen 41 of the same configuration and then attempting drawing.

In consideration of this, the third pen 41 that has a pen tip 413 different than that of the first pen 41 and the fourth pen that has a type of ink different than that of the first pen 41 are provided. In cases where drawing in the undrawn area Ra is consecutively attempted by using these pens 41, there is a high possibility that the non-drawing will be resolved and, as a result, it is possible to realize high-definition nail printing on various types of nails T.

The embodiment described above is for the purpose of elucidating the present invention and is not to be construed as limiting the present invention. The invention can of course be altered and improved without departing from the gist thereof.

For example, in the first embodiment, an example is given of a case in which one pen is held in standby in the pen standby unit as the spare pen 41, and this spare pen 41 had a pen tip 413 of the same shape and ink for use in drawing of the same type as the pen 41. However, the spare pen is not limited to one pen and a plurality of pens may be held in standby.

Also, in the second embodiment, an example is given of a case in which one of each types of the pens 41 are held in standby in the pen standby unit 62. However, the number of pens held in standby in the pen standby unit 62 is not limited thereto.

For example, a plurality of each of the types of pens 41, such as two of each of the first pen 41 to the fourth pen 41 or the like, may be held in standby in the pen standby unit 62.

In the second embodiment, a configuration is described in which the third pen 41, in which the type of the pen tip 413 differs from that of the first pen 41, has a pen tip 413 that is narrower than that of the first pen 41. However, the pen 41 in which the type of pen tip is different is not limited thereto.

For example, a pen 41 that has a pen tip 413 that is thicker than that of the first pen 41 may be used as the third pen 41 or, in a case where the pen tip 413 of the first pen 41 is a ballpoint pen type tip, a pen 41 that has a felt pen tip, a calligraphy pen tip, or the like may be used as the third pen 41.

In the second embodiment, a configuration is described in which the fourth pen 41, in which the type of ink differs from that the first pen 41, draws by using ink of a lower viscosity than that of the ink of the first pen 41. However, the pen 41 in which the type of ink is different is not limited thereto.

For example, a pen 41 that draws by using ink in which the type of coloring material or the like included in the ink differs may be used as the fourth pen 41.

In the second embodiment, an example is given of a case in which three types of pens 41 are held in standby in the pen standby unit 62 as the spare pens 41, namely, the spare pen 41 (the second pen 41) that has the same type of pen tip 413 and ink as the first pen 41, the spare pen 41 (the third pen 41) in which the type of pen tip 413 differs from that of the first pen 41, and the spare pen 41 (the fourth pen 41) in which the type of ink differs from that of the first pen 41. However, the types of pens held in standby in the pen standby unit 62 are not limited thereto.

For example, configurations are possible in which pluralities of types of pens 41 other than these are provided in the pen standby unit 62 as the spare pens 41, or in which only a portion of the types of pens 41 described above is provided in the pen standby unit 62 as the spare pen 41.

For example, a configuration is possible in which, in cases where the drawing condition determination portion 815 has determined that an undrawn area Ra is present, instead of immediately replacing the pen 41, test drawing is performed once in the test drawing portion 61 and the pen tip 413 is readied and, thereafter, drawing is attempted again by using the same pen 41.

Additionally, a configuration is possible in which pen replacement is performed in cases where the undrawn area Ra still occurs after changing the drawing direction and attempting drawing multiple times by using the same pen 41.

In the embodiments described above, an example is given of a case in which the pen 41 applies white ink for a base layer. However, the pen 41 is not limited to a base layer pen and, for example, the present invention may be applied to cases in which a pen 41 is used that draws by using ink containing glitter to draw line patterns.

In the embodiments described above, a configuration has been described in which the drawing head 43 of the nail printing apparatus (the drawing apparatus) 1 is provided with the pen holding portion 42 that holds the pen 41 for drawing and also the ink jet head 71. However, the drawing apparatus may have a configuration in which the ink jet head 71 is not provided and the drawing is performed by only the pen 41.

In the embodiments described above, a configuration has been described in which the pen 41 is used as the drawing tool. However, the drawing tool of the present invention is not limited to the pen 41. A configuration is possible in which the ink jet head 71 is used as the drawing tool. In this case, the drawing tool standby unit 62 is configured to be capable of holding at least one spare ink jet head 71 at standby. Also, the ink jet head 71 held in the ink jet holder 72 is configured to be replaceable with the spare ink jet head 71 held at standby in the drawing tool standby unit 62.

In the embodiments described above, an example has been given of a case in which the drawing head 43 is provided with one pen holding portion 42. However, the number of the pen holding portions 42 provided in the drawing head 43 is not limited to one. For example, a configuration is possible in which two or more pen holding portions 42 are provided and two or more pens 41 for drawing are held.

In the embodiments described above, an example has been given of a case where the imaging device 51 and the illumination device 52 are mounted on the drawing head 43. However, the location where the imaging device 51 and the illumination device 52 are provided is not limited thereto.

For example, a mechanism for moving the imaging unit 50 may be provided separately from the mechanism for moving the drawing head 43.

In the embodiments described above, an example has been given of the nail printing apparatus 1 in which fingers are inserted into the apparatus one finger at a time and drawing is performed sequentially. However, a configuration is also possible in which consecutive drawing can be performed on a plurality of fingers, without the need to insert and remove each finger.

The embodiments described above are not to be construed as limiting the scope of the present invention and include the scope of the invention recited in the claims and equivalents.

The invention claimed is:

1. A drawing apparatus comprising:

a drawing head that detachably holds a first drawing tool for drawing on an object;

a drawing tool standby unit that causes a second drawing tool to stand by; and a processor;

wherein the processor:

in a state where the first drawing tool is held in the drawing head and the second drawing tool is held in the drawing tool standby unit, controls the drawing head to perform drawing within a first region of the object by using the first drawing tool;

causes the first drawing tool to be replaced with the second drawing tool when a first undrawn area exists within the first region after performing the drawing within the first region of the object by using the first drawing tool, the first undrawn area being an area where the drawing using the first drawing tool was not performed correctly; and controls the drawing head to perform drawing in the first undrawn area by using the second drawing tool; and wherein each of the first drawing tool and the second drawing tool includes an ink cartridge that stores ink and an ink discharging portion that performs drawing on the object by discharging the ink on the object.

2. The drawing apparatus according to claim 1, wherein:

the first drawing tool is configured to perform drawing on the object by using a first ink stored in the ink cartridge of the first drawing tool;

the second drawing tool is configured to perform drawing on the object by using a second ink stored in the ink cartridge of the second drawing tool; and the first ink and the second ink are different from each other.

3. The drawing apparatus according to claim 1, further comprising:

a camera provided for imaging the object;

wherein after the processor has controlled the drawing head to perform the drawing within the first region of the object by using the first drawing tool, the processor causes the camera to image the first region of the object, and determines whether or not the first undrawn area exists within the first region based on information of an image of the first region imaged by the camera.

4. The drawing apparatus according to claim 1, wherein:

the processor controls the drawing head to perform drawing in the first region by using the first drawing tool by causing the first drawing tool to move along a first direction in the first region; and the processor controls the drawing head to perform drawing in the first undrawn area by using the second drawing tool and causing the second drawing tool to move along a second direction different from the first direction in the first undrawn area.

5. The drawing apparatus according to claim 1, wherein when the first undrawn area exists within the first region and after the processor has controlled the drawing head to replace the first drawing tool held in the drawing head with the second drawing tool, the processor controls the drawing head to perform the drawing in the first undrawn area by using the second drawing tool and subsequently controls the drawing head to perform drawing in a second region different from the first region by using the second drawing tool.

6. The drawing apparatus according to claim 1, further comprising:

a display;

wherein when the first undrawn area exists within the first region after performing the drawing within the first region of the object by using the first drawing tool, the processor causes the display to display a message prompting inspection of the first drawing tool or replacement of the first drawing tool with the second drawing tool.

7. The drawing apparatus according to claim 1, further comprising:

a display;

wherein when the first undrawn area exists in the first region after performing the drawing within the first region of the object by using the first drawing tool and the processor has controlled the drawing head to replace the first drawing tool held in the drawing head with the second drawing tool, and when a second undrawn area exists within the first region after performing the drawing in the first undrawn area by using the second drawing tool, the second undrawn area being an area where the drawing using the second drawing tool was not performed correctly, the processor causes the display to display a first message indicating that the drawing in the first undrawn area by using the second drawing tool was not correctly performed or a second message prompting replacement of the second drawing tool.

8. The drawing apparatus according to claim 1, wherein the object is a nail of a finger or a toe.

9. A drawing method for a drawing apparatus, the drawing apparatus comprising a drawing head that detachably holds a first drawing tool for drawing on an object and a drawing tool standby unit that causes a second drawing tool to stand by, each of the first drawing tool and the second drawing tool including an ink cartridge that stores ink and an ink discharging portion that performs drawing on the object by discharging the ink on the object, and the drawing method comprising:

in a state where the first drawing tool is held in the drawing head and the second drawing tool is held in the drawing tool standby unit, controlling the drawing head to perform drawing within a first region of the object by using the first drawing tool;

causing the first drawing tool to be replaced with the second drawing tool when a first undrawn area exists within the first region after performing the drawing within the first region of the object by using the first drawing tool, the first undrawn area being an area where the drawing using the first drawing tool was not performed correctly; and controlling the drawing head to perform drawing in the first undrawn area by using the second drawing tool.

10. The drawing method according to claim 9, wherein:

the first drawing tool is configured to perform drawing on the object by using a first ink stored in the ink cartridge of the first drawing tool;

the second drawing tool is configured to perform drawing on the object by using a second ink stored in the ink cartridge of the second drawing tool; and the first ink and the second ink are different from each other.

11. The drawing method according to claim 9, wherein the drawing apparatus further comprises a camera provided for imaging the object; and wherein the drawing method further comprises:

after the drawing head has been controlled to perform the drawing within the first region of the object by using the first drawing tool, controlling the camera to image the first region of the object; and determined determining whether or not the first undrawn area exists within the first region based on information of an image of the first region imaged by the camera.

12. The drawing method according to claim 9, wherein:

the controlling the drawing head to perform the drawing within the first region of the object by using the first drawing tool includes causing the first drawing tool to move along a first direction in the first region; and the controlling the drawing head to perform the drawing in the first undrawn area by using the second drawing tool includes causing the second drawing tool to move along a second direction different from the first direction in the first undrawn area.

13. The drawing method according to claim 9, further comprising, after the drawing head has been controlled to perform the drawing in the first undrawn area by using the second drawing tool, controlling the drawing head to perform drawing in a second region different from the first region by using the second drawing tool.

14. The drawing method according to claim 9, wherein the drawing apparatus further comprises a display; and wherein the drawing method further comprises: when the first undrawn area exists within the first region after performing the drawing within the first region of the object by using the first drawing tool, controlling the display to display a message prompting inspection of the first drawing tool or replacement of the first drawing tool with the second drawing tool.

15. The drawing method according to claim 9, wherein the drawing apparatus further comprises a display; and wherein the drawing method further comprises, when the first undrawn area exists within the first region after performing the drawing within the first region of the object by using the first drawing tool and the drawing head has been controlled to replace the first drawing tool held in the drawing head with the second drawing tool, and when a second undrawn area exists within the first region after performing the drawing in the first undrawn area by using the second drawing tool, the second undrawn area being an area where the drawing using the second drawing tool was not performed correctly, controlling the display to display a first message indicating that the drawing in the first undrawn area by using the second drawing tool was not correctly performed or a second message prompting replacement of the second drawing tool.

* * * * *